United States Patent

Angus et al.

[15] 3,661,526

[45] May 9, 1972

[54] PROCESS FOR THE CATALYTIC GROWTH OF METASTABLE CRYSTALS FROM THE VAPOR PHASE

[72] Inventors: John C. Angus; Nelson C. Gardner, both of Cleveland Heights, Ohio

[73] Assignee: Case Western Reserve University

[22] Filed: June 24, 1969

[21] Appl. No.: 835,929

[52] U.S. Cl. ............................................. 23/209.1, 23/301
[51] Int. Cl. ................................. C01b 31/06, B01j 17/20
[58] Field of Search ..................................... 23/209.1 D, 301

[56] References Cited

UNITED STATES PATENTS

| | | | |
|---|---|---|---|
| 2,947,609 | 8/1960 | Strong | 23/209.1 D |
| 3,030,188 | 4/1962 | Eversole | 23/209.1 D |
| 3,297,407 | 1/1967 | Wentorf, Jr. | 23/209.1 D |
| 3,371,996 | 3/1968 | Hibshman | 23/209.1 D |
| 3,423,177 | 1/1969 | Bovenkerk | 23/209.1 D |

OTHER PUBLICATIONS

J. C. Angus et al.; " Growth of Diamond Seed Crystals by Vapor Deposition;" Journal of Applied Physics; Vol. 39 No. 6; May 1968; pp. 2915- 2922.

Primary Examiner—Oscar R. Vertiz
Assistant Examiner—G. Alyaro
Attorney—McNenny, Farrington, Pearne and Gordon

[57] ABSTRACT

There is provided a process for growing metastable crystals, e.g., diamonds, from seed crystals at sub-atmospheric pressures and temperatures in the range of from 800°–1,700° C. The process is characterized by the provision of a catalytic, mobile transfer medium as a layer upon the surface of the seed crystal and exposing the catalytically coated seed crystal to a gas containing the crystallizable material under the foregoing conditions of temperature and pressure.

11 Claims, 1 Drawing Figure

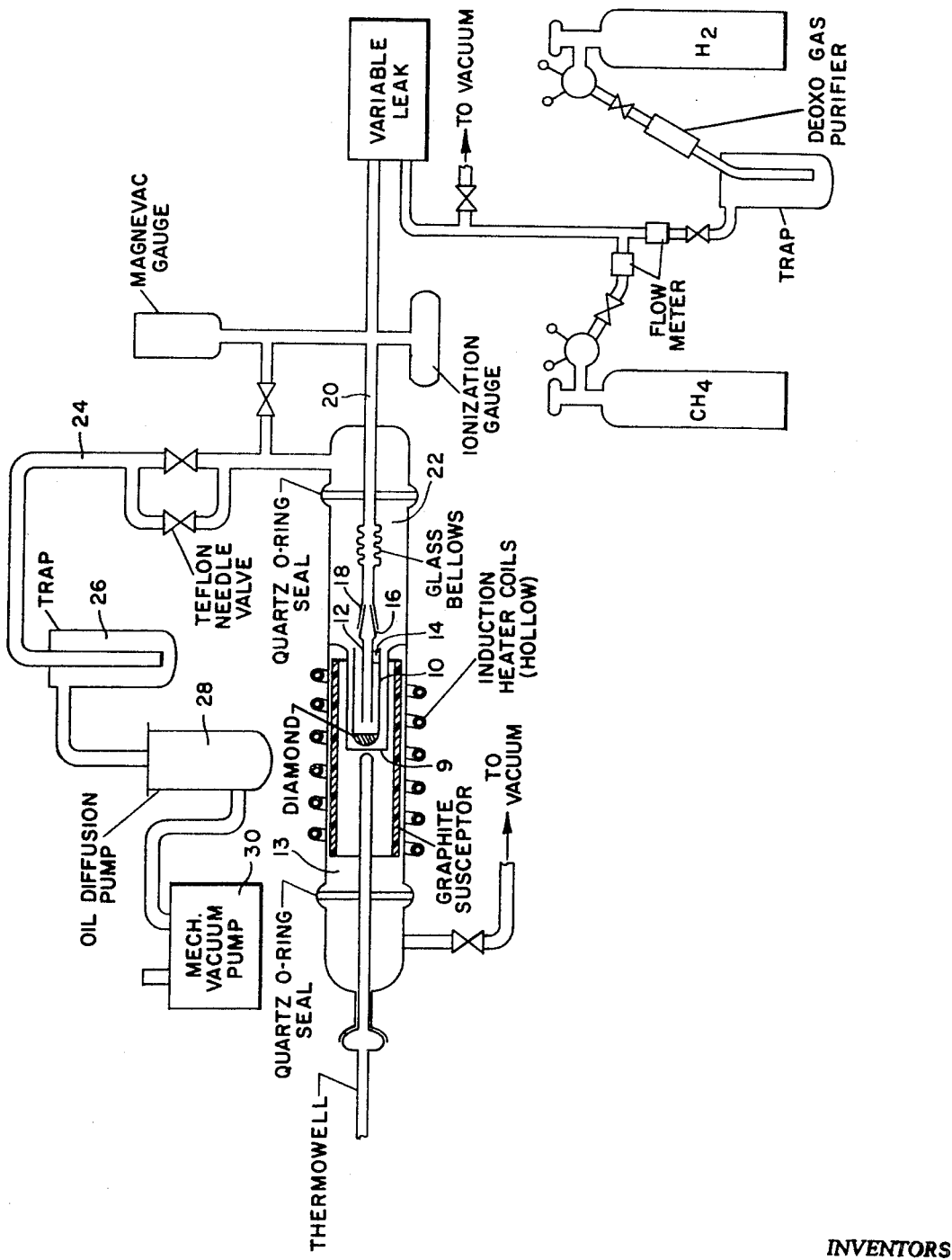

PROCESS FOR THE CATALYTIC GROWTH OF METASTABLE CRYSTALS FROM THE VAPOR PHASE

BACKGROUND OF THE INVENTION AND PRIOR ART

This invention relates as indicated to a process for the growth of metastable crystals under certain conditions of temperature and pressure from a vapor phase including the crystallizable material either in elemental form or as a decomposable compound, and characterized by the interposition between the solid crystalline phase and the gaseous phase including the crystallizable material of a catalytically active mobile transfer medium.

In previously filed patent application, there have been described processes for the growth of diamond crystals from gas media containing carbon in chemically combined form under conditions of temperature and pressure not substantially different from those herein contemplated. The compounds from which the crystallizable material has been derived include methane, ethane, acetylene, etc., from which elemental carbon is released. Under the conditions of temperature and pressure obtaining, growth of diamond upon seed crystals can be effected. It has been described in such applications also that the carbon-containing gas may be modified by the inclusion of doping agents, e.g., boron, lithium, and aluminum, to produce interesting products useful, for example, in electronics as semiconductors. The apparatus which is used for carrying out these processes is like that shown in the drawing annexed to the present application. These processes contemplated temperatures in the range of from 800° to 1,450° C. and pressures which ranged from $10^{-8}$ to 760 Torr. The seed crystals which may be used in carrying out these prior processes include industrial diamond dust.

Other prior art methods for the growth of crystals such as diamonds include that disclosed by Brinkman in U.S. Pat. No. 3,142,539. The patentee contemplates temperature in the range of from 1,000° to 1,800° C. and a molten metallic bath for transporting dissolved carbon to seed crystals which is dependent upon the maintenance therein of a temperature differential within the molten medium whereby the concentration of carbon in its different forms is controlled so as to favor the nucleation and deposition of the diamond form. The present invention is distinguished from the Brinkman invention in that a temperature differential and the circulation of portions of the medium is not involved and the equipment therefore rendered much less complex.

Also included among the prior art is the U.S. Pat. to Hibshman, No. 3,371,996 which discloses a catalytic diamond growth process in which a catalytic amount of solid, particulate catalytic metal is mixed with finely divided diamond seed crystals and contacted with a carbon monoxide gas at a pressure of from 1 to 2,000 atmospheres and a temperature ranging from 600° to 1,100° C. The catalyst metals are selected from the precious metals and nickel.

The present process utilizes sub-atmospheric pressures and different gases. Moreover, the catalysis system is different, the prior art utilizes a solid catalyst which contacts the gas phase only, whereas the present invention interposes between the gas and the solid phases a mobile catalyst layer so as to contact simultaneously the gas phase and the solid crystalline phase and to act as a transfer medium for the crystallizable material.

By the process of the present invention, growth rates of the metastable crystals are improved over uncatalyzed systems, the equipment is simplified, and the amount of metal involved is minute in comparison with prior art molten bath procedures.

BRIEF STATEMENT OF THE INVENTION

Briefly stated, the present invention is in the provision of a process for growing metastable crystals by epitaxy on a seed crystal from a crystallizable material contained in the vapor phase. The process includes the steps of depositing on the surface of the crystal a catalytic layer which comprises a catalytic element or combination of elements. The catalytic layer accepts the crystallizable material from the vapor phase and, under the conditions of crystal epitaxy, transfers that material to the crystal surface where metastable crystal growth occurs. The layer is converted into a mobile transfer medium for the crystallizable material by elevating the temperature to within the range of 800° to 1,700° C. whereby the layer becomes mobile and transports the crystallizable material from the vapor layer interface to the layer/seed crystal interfere. Contact of the seed crystal with the vapor phase is conducted at pressures below atmospheric, i.e., in the range of from $1 \times 10^{-8}$ to 759 Torr, and preferably of the order of $1 \times 10^{-4}$ to 500 Torr. It has been found that subatmospheric pressures inhibit graphite nucleation. It is surprising that this process permits the growth of the metastable crystals rather than the stable form. With diamond growth, one would normally except graphite formation rather than new diamond.

This invention has particular applicability to the deposition of carbon in the crystal form of diamond. The diamonds which may be produced in accordance with this process have utility as gemstones, as industrial abrasives, and in the electronics field as semiconductors when properly treated with "doping agents."

BRIEF DESCRIPTION OF THE DRAWING

The annexed drawing is a diagrammatic and schematic illustration of apparatus useful in carrying out the process of the present invention.

DETAILED DISCUSSION OF THE CATALYTICALLY ACTIVE MOBILE TRANSFER MEDIUM

The essence of the present invention is not simply in the provision of a catalyst. It is also in the condition of the catalytic layer or film under the conditions of crystal growth. The catalyst layer under the conditions of crystal growth must be "mobile," that is, the catalyst layer is a mobile surface layer which provides a dynamic interface interposed between the solid, crystalline substrate for the layer and gaseous source of crystallizable material, e.g., carbon. It must permit mobility of atoms of the crystallizable material both normal to the surface of the solid substrate and movement parallel to that surface. Thus the term "mobile" is used in a broad sense and contemplates not only a liquid film at or above its melting point, but also extremely thin films, e.g., monolayers one atom thick, near or above this temperature and to which the term "liquid" cannot be applied. Generally, the layer of catalytic material may range in thickness from less than one "monolayer" to 1 mm. Usually the few micron thicknesses (i.e., 3 to $10\mu$) obtained by vacuum vapor deposition are quite satisfactory and conveniently obtained by conventional "shadowing" techniques, or plasma deposition. Other deposition techniques may be used, for example by decomposition of a volatile metal halide, e.g., aluminum chloride.

Although the temperature range for carrying out the epitaxy process is broadly 800° to 1,700° C., and preferably in the range of from 1,000° to 1,350° C., the minimum temperature of operation must also be sufficient to insure a "mobile" catalyst layer. The atom of crystallizable material transported through the catalytic layer may form a eutectic mixture therewith having a lowered mobility point. For most purposes, this may be considered to be equal to the melting point of any eutectic formed, although in extremely thin films, e.g., a monolayer, mobility is observed in at temperatures below the melting point of the element constituting the monolayer. If no eutectic is formed between the crystallizable material and the catalyst in the mobile layer, then the minimum temperature of operation will be in most cases (except for extremely thin films) the melting point of the element or mixture of elements (e.g., an alloy). With extremely thin films, temperatures below the melting point can be used without loss of "mobility."

At the more elevated temperatures, i.e., above about 1,400° C., the catalytic layer or transfer medium has an increased tendency to vaporize. Loss of the mobile transfer medium or catalytic layer, may be minimized in some cases or negated by providing within the system a source of additional catalytic material to maintain the partial pressure at a predetermined level to continuously replace any that is lost. A small boat or crucible of molten catalytic metal adjacent the seed crystals will suffice for this purpose.

Nevertheless, the maximum temperature of operation may be governed not only by the transition temperature of the crystal being grown, but also by that which will preserve a "mobile" film on the crystal surface without substantial vaporization at the pressures employed. Thus, the catalytic layer may impose a maximum temperature of operation which is less than the decomposition or transition temperature for the crystal in question.

In selecting temperature and pressure conditions, it has been found desirable with pressures at the higher end of the range to use temperatures toward the lower end of the temperature range, or to add hydrogen gas, or a combination of both. Conversely, with the higher temperatures at the upper end of the temperature range, i.e., above 1,350° C., lower pressures or the addition of hydrogen gas or both should be used.

The mobile catalytic layer performs important functions in the contemplated epitaxy systems. It promotes the rate of crystal growth. Also, it shields the surface from deleterious impurities, e.g., water and oxygen. Also, it is believed that it orders the crystal surface which inhibits transformation of the metastable crystal to the stable form and permits growth of the metastable form. In the case of diamond, this transformation is to graphite, a normally strongly competing reaction. By bonding to the crystal surface, the catalyst-crystal combination provides a site for growth which is more receptive to an incoming atom of the crystalline phase than the unaltered crystalline phase itself. As the crystal grows under the catalytic layer, the layer is lifted by the newly grown surface and remains virtually unchanged, and interposed between the gaseous source of crystallizable atoms and the solid crystal phase.

Materials suitable for providing the mobile catalytic layer include both polyvalent metallic and nonmetallic elements and alloys. Metals are preferred. Specific examples of suitable metals include iron, nickel, manganese, chromium, cobalt, aluminum, platinum, palladium, rhenium, ruthenium, iridium, rhodium, osmium, etc. Nonmetal materials include phosphorus, arsenic and boron. Sulfur and silicon may be present with the metallic catalytic materials, and alloys of such metals may also be used as will appear below. Salts, e.g., metal halides of the foregoing, such as $AlCl_3$, $FeCl_3$, or the like, may be used to generate the mobile layer in situ.

In the growth of diamonds many of these materials serve a plural catalytic purpose, especially iron, nickel, cobalt, platinum and palladium. First, they catalyze the growth of the metastable crystal. Secondly, the catalytic material also acts as a negative catalyst or inhibitor of the formation of the stable crystal. In some cases, such materials also catalyze the dehydrogenation of hydrocarbons to yield carbon which dissolves in the mobile catalytic transfer medium.

In general, the catalyst material should have one or more of the following properties:

a. It should provide a suitable transport medium while in the mobile state. In the case of carbon for diamond growth, the catalyst when in the molten state should dissolve carbon.

b. The bonding of the catalyst at the interface of the crystal should not be so strong that it cannot be replaced by crystallizable material precipitating from the mobile transport medium.

c. It should not form with the crystallizable material an extremely stable compound which will precipitate as a stable solid under crystal growth conditions. In diamond crystal growth, then, the catalyst should not form a highly stable carbide with the carbon being transported through the mobile catalytic transport medium.

d. Desirably, the catalyst should form a eutectic with the crystallizable material, e.g., carbon, at temperatures below the transition temperature of the solid crystalline phase, e.g., below about 1,800° C. for diamond.

e. The catalyst should wet the surface of the crystal on which growth is to take place.

f. It should not be soluble to any substantial degree in the solid metastable crystalline phase. The degree of solubility which can be tolerated in the crystal depends upon the specific application for which the crystal is intended. For example, diamond to be used as an abrasive material can have foreign impurities up to 0.1 percent or more by weight. For semiconductor applications, one part per million may be excessive.

Thus, where carbon is the material being transferred from the vapor phase through the mobile, relatively thin layer, the bond between the layer and the seed crystal, whether it be chemical or electrochemical in nature, should not be so strong that it cannot be severed to permit the metal or catalytic element to be replaced by carbon atoms precipitating from the transfer medium.

The application of the relatively thin layer of the transfer medium which becomes "mobile" under the conditions of the practice of this invention is achieved most conveniently by vacuum vapor deposition or " This This is a well known technique for applying a thin layer of material to an object. In the present case the seed crystals, for example diamond baguettes, may be "shadowed" by merely placing them in a container, e.g., a Petrie dish, disposed in a bell jar assembly and adjacent a tungsten "crucible" containing the catalyst material. The tungsten "crucible" is adapted to be heated electrically to a very high temperature and under reduced pressures maintained within the bell jar to effect vaporization of the catalyst material. The vaporized catalytic material is then condensed onto the crystalline material contained within the Petrie dish in a very thin film. Films may be deposited in this manner which vary in thickness from monoatomic layers to layers substantially thicker, i.e., 1 mm. thick. Instead of depositing the catalytic medium by this means, other means such as immersion into molten metal, plasma deposition or in situ melting of the elemental catalyst on the crystal may be utilized. Another useful procedure is to carry out an in situ vapor deposition of the catalytic layer on the surface of the seed crystals, or baguettes, in the same apparatus in which epitaxy is conducted. This procedure has the advantage of minimizing the introduction of impurities such as water vapor or oxygen which may occur in transferring from the coating or shadowing apparatus to the deposition apparatus. After the seed crystal has been treated so as to become coated with a thin layer of the catalytic material, it is then disposed within the apparatus such as shown in the annexed drawing.

DETAILED DESCRIPTION OF THE APPARATUS

Referring now more particularly to the annexed drawing, there is here shown in diagrammatic and schematic form an apparatus useful in growing diamonds from seed crystals or from diamond baguettes. Where legends are not supplied on the drawing, numerals are employed for identification purposes. The apparatus includes a supply cylinder for methane gas. In specific examples which will be described later, methane gas of the highest available purity is used, e.g. 99.99 percent $CH_4$, dew point approximately $-100°$ F., maximum 3 ppm $O_2$ and 15 ppm $N_2$. Where hydrogen is used in conjunction with the carbon containing gas, a supply cylinder of hydrogen gas fitted with a deoxo gas purifier and a water trap is provided. Lines from these supplies are passed through suitable flow meters for regulating the amount and rate of each of the gases, and in turn connected through a variable leak system to control flow into the apparatus. A vacuum connection is provided in the line.

The growth chamber is composed of a large outer quartz tube, sealed at each end and extending through hollow induction heating coils. Immediately adjacent the inside walls of the quartz reactor tube there is provided a graphite susceptor which coacts with the induction heater coils to provide heat to the sample. The graphite susceptor is isolated from the portion of the system in which the deposition takes place by an internal glass wall 9. The chamber 13 containing the susceptor is maintained under vacuum by a vacuum pump. The temperature of the sample is sensed through a suitable thermowell adapted to receive a thermocouple, not shown.

Supported within the large quartz tube and surrounded by the graphite susceptor is a test tube adapted to carry a diamond sample in its closed end. The test tube which is formed of quartz is identified by the numeral 10. Projecting deep into the test tube and through the open end thereof is a delivery tube 12 secured to the tube 10 by a weldment 14. The delivery tube is provided with a male fitting 16 adapted to be received in a corresponding female fitting 18 at the end of conduit 20. Glass bellows are conveniently provided to minimize breakage and to permit flexibility for convenient assembly. The conduit 20 leads from the variable leak system. Gas flows into the system through the delivery tube 12 and is brought into contact with the diamond sample disposed in the closed end of tube 10. Gases are exhausted through the open end of the tube and escape into the chamber 22 for removal through a vacuum system including an exit line 24 having a trap 26 in series with an oil diffusion pump 28 and a mechanical vacuum pump 30. The temperature of the sample can be very closely controlled to a desired temperature within the range stated, and any pressure from atmospheric to $1 \times 10^{-8}$ Torr is obtainable with the apparatus shown.

In order to grow high quality crystals at useful yields, it is necessary that the entire deposition system be vacuum tight. Great care must be exercised to eliminate all leaks which permit entrance of air or any of its components into the system.

Before the seed crystals are coated with the catalytic layer, it is desirable to clean the crystals so as to remove any impurities adhered to the surface including water, oxygen, graphite, etc. Graphite may be selectively removed from diamond seed crystals by reaction with hydrogen gas at pressures on the order of 50 atmospheres and temperatures on the order of 1,000° C. The cleaning reaction is the reverse of the methane reaction of diamond with hydrogen at these conditions of temperature and pressure is about three orders of magnitude less than the rate of reaction for hydrogen with graphite under the same conditions. Thus, graphite may be removed from diamond with very little loss of diamond. The reaction time for cleaning a supply of diamond seed crystals is about 7 hours. The apparatus may be similar to that used for the growth of diamond crystals, e.g., that shown in the annexed drawing, but able to withstand high pressures, e.g., 50 psig. Metallic impurities may be removed by pretreatment of the diamond crystals with aqua regia. In the annexed examples where diamond seed crystals are utilized, these may be in the form of natural diamond seed crystals having a particle size of from 0 to 1 micron or from 1 to 5 microns. Industrial diamonds usually contain metallic impurities along with graphite and both acid and hydrogen treatments are indicated. Certain impurities such as tungsten oxides may be removed only with hydrofluoric acid. Acid treatment is carried out for a 24-hour period in a polyethylene container. The acid is decanted and the powder thoroughly rinsed with distilled water. Drying is effected by heating in an oven at a temperature not in excess of 100° C. At this point the seed crystal material may be submitted to the hydrogen cleaning process. This process provides a surface free of metals and oxides.

It becomes convenient at this point to illustrate the process of this invention by giving illustrative specific examples as a guide to those skilled in the art for carrying out the process of this invention.

EXAMPLE 1

Iron is vapor deposited on a diamond baguette. The baguette is a tenth carat stone. The amount of iron is about 0.2 mg. The iron-coated baguette is heated at 1,200° C. for 3 hours 40 minutes under an atmosphere of methane at a pressure of 10 microns. After the run the baguette is carefully removed and examined microscopically. A number of small needle-like protuberances are observed. It is also noted that there are glossy black spots on the sample holder. Cleaning of the sample is accomplished by 16-hour treatment in aqua regia, followed by 70 hours in hydrofluoric/nitric acid, followed by 8 hours under hydrogen at approximately 50 atmospheres pressure and 1,050° C. This combination of treatments removes iron, iron carbides, silica and graphitic carbon as well as all other common metals and oxides. The surface of the crystal is then examined microscopically and enlarged areas with a bumpy or hillocky type growth structure are observed. The examinations are done at various magnifications under reflection phase contrast conditions using the microscope. The average height of the new diamond growth on the diamond surface is approximately 1 micron. Calculations indicate that this growth rate is approximately 100 to 1,000 times greater than that which would be observed without the catalytic agent present.

EXAMPLE 2

Following the same procedure as in Example 1, an iron-nickel alloy is vapor deposited upon a diamond macle of about one-tenth carat in weight. The iron-nickel coated macle is heated at a temperature of 1,300 C. for 12 hours under an atmosphere of methane at a pressure of 50 microns. Growth occurs on the (111)-plane. After the run the macle is carefully removed and examined microscopically. Cleaning of the sample is accomplished by 16-hour treatment in aqua regia followed by treatment with hydrofluoric acid and a sulfuric/nitric acid mixture (50:50), followed by 8 hours under hydrogen at approximately 50 atmospheres pressure and 1,050° C. The surface of the crystal is then reexamined microscopically and enlarged areas with protuberances are observed. The average height of the new diamond growth on the diamond surface is approximately 1 micron. It has been determined that the growth rate in this particular example is approximately 500 times greater than that which would be observed without the presence of the catalytic mobile transfer medium composed of iron-nickel alloy. The iron-nickel alloy in the present example has a composition of 95 percent iron and 5 percent nickel.

EXAMPLE 3

This example illustrates operation utilizing a catalytic mobile transfer layer at a temperature well below the eutectic temperature for the iron-carbon system (95 percent iron, 5 percent carbon at 1,150° C.). In this case the pressure was maintained at 200 microns and the temperature of operation was maintained at 1,043° C. for 12 hours. At this low temperature, this particular catalyst is not mobile. The catalystic layer was deposited on the (111)-plane and consisted of metallic iron. No growth of diamond was observed in this case. However, when the temperature is elevated to 1,200° C. as in Example 1, growth is observed.

EXAMPLE 4

This example illustrates the use of nickel as the catalytic mobile transfer medium. In this case the pressure utilized is 200 microns, and the temperature is maintained at 1,350° C. for a period of 8 hours. The gas utilized is methane. The cleaning procedure is as set forth in Example 1. In this case, greatly increased growth rates were observed, and diamond growth is observed upon microscopic examination.

EXAMPLE 5

The same procedure as set forth in Example 1 is followed utilizing metallic iron as catalytic mobile transfer medium vapor deposited on the (111)-plane. The gas employed is ethylene at 50 microns pressure and the temperature of the reaction is maintained at 1,200° C. for a period of 12 hours. Under these circumstances, increased growth rates over those obtained in the absence of the catalytic mobile transfer medium are observed.

EXAMPLE 6

The same procedure as set forth in Example 5 above is followed with the exception that the temperature is maintained at 1,150° C., and a mixture of methane plus 1 percent by volume of diborane is utilized. The catalytic mobile transfer medium is as set forth in Example 5. The pressure at which the system is maintained is 50 microns. Macroscopic growth is obtained. The cleaned product is dark and and chemical analysis shows the presence of boron in the crystal lattice. Such boron-containing diamonds are useful in semiconductors.

EXAMPLE 7

The same procedure as set forth in Example 1 is followed utilizing a relatively thick layer (approximately 1 mm) of pure iron as the mobile transfer medium on the (111)-plane. The gas employed is 5 volume percent methane in hydrogen at a total pressure of 500 Torr and the temperature is 1,170° C. The growth time is 2 hours. Under these conditions increased rates are observed and diamond growth is observed upon microscopic examination.

EXAMPLE 8

This example illustrates the use of high temperatures and low pressures. The same procedure as set forth in Example 1 is followed using a thin layer of pure nickel as the mobile transfer medium. A good quality macle is used as the seed crystal and deposition takes place on the (111)-plane for a period of 3 hours. The gas used is 5 volume percent methane in hydrogen at a pressure of $10^{-5}$ Torr. and a temperature of 1,600° C. Under these conditions increased growth rates are observed and diamond growth is observed upon microscopic examination.

In the foregoing examples, the apparatus used is that which is shown in the annexed drawing. In those cases where temperatures are above the softening point of quartz, alumina components should be used.

For comparative purposes, the iron-carbon eutectic temperature is 1,150° C. The nickel-carbon eutectic temperature is 1,318° C.

As indicated above, the catalytic mobile transfer media, the use of which is illustrated in the foregoing examples, demonstrate a dual catalytic effect. These metals in the condition prevailing under the conditions of temperature and pressure within the system aid in the decomposition of the carbon containing material constituting the vapor phase to provide elemental carbon. Thereafter, the catalytic mobile transfer medium aids in promoting the transition of carbon in the form of a precursor in the vapor phase to the metastable diamond in the solid phase. These principles are applicable to the growth of other metastable crystals, e.g., polymorphs of silicon carbide and cubic boron nitride.

The catalytic transfer medium may be composed of one, two or more elements. A compatible metal, for example, may be added to the mobile liquid transfer medium as a catalytic agent for the decomposition of the hydrocarbon source of carbon, for example. The mobile transfer medium may also contain materials which inhibit, for example, iron carbide formation thereby reducing the tendency to form the undesirable solid carbide $Fe_3C$. Nickel is a material which catalyzes the decomposition of hydrocarbons and prevents carbides from forming. The catalytic mobile transfer medium may also include an element or compound which aids in the wetting of the crystal surface. Iron is particularly suitable as an agent for promoting wetting of a diamond surface. Small additions of elements which promote wetting can be made to the catalytic agent. These elements should have moderate tendency to bond with carbon, i.e., are carbide formers, but not so great as to form an immobile surface layer. An example of an additive which forms overly strong bonds with carbon is titanium. Manganese is an example of an additive which is suitable for this purpose.

The purity of the crystalline surface upon which growth is to occur cannot be over-emphasized. Cleaning of diamond surface, for example, prior to the exposure to the growth conditions may be effected by one or the other or both of the cleaning processes described above in conjunction with Example 1.

Thus the pretreatment with hydrogen or with acid or with both is highly desirable to insure a clean diamond surface. Contamination by oxygen and water must be avoided. When these conditions are maintained, the deposition of graphitic carbon in the case of diamond crystal growth is inhibited.

Although the examples above show the utilization of normally gaseous hydrocarbons as the carbon precursor, there may be used as a replacement for part or all of the exemplified hydrocarbons any saturated or unsaturated hydrocarbon which can be vaporized under the conditions of the deposition of diamond. Thus alkanes, alkenes, and alkynes may be used herein as the sole component of the gas phase, or in combination with hydrogen, with or without other additive materials, e.g., doping agents, or in situ mobile transfer medium precursors such as metal halides.

What is claimed is:

1. A process for metastable crystal epitaxy of a diamond crystal from a vapor phase containing a decomposable hydrocarbon which yields carbon crystallizable onto said diamond crystal comprising depositing on the surface of said diamond crystal a catalytic layer of iron, nickel, cobalt, or manganese less than 1 mm. thick in which layer said carbon is soluble, converting said layer into a mobile transfer medium substantially covering the surface area on which growth is desired by elevating the temperature to within the range from about 800° C. to about 1,700° C. whereby said layer is mobilized to transport said carbon and contacting said layer with said hydrocarbon in the vapor phase at a pressure from about $1 \times 10^{-8}$ to less than 760 Torr.

2. A process in accordance with claim 1 in which the catalytic layer is nickel.

3. A process in accordance with claim 1 in which the catalytic layer is iron.

4. A process in accordance with claim 1 in which the catalytic layer is an iron alloy with nickel.

5. A process in accordance with claim 1 in which the catalytic layer is vacuum vapor deposited.

6. A process in accordance with claim 1 in which the catalytic layer forms a eutectic mixture with carbon.

7. A process in accordance with claim 12 in which the temperature of crystal epitaxy is at or above the eutectic temperature.

8. A process in accordance with claim 1 in which the pressure is in the range of $1 \times 10^{-4}$ to 500 Torr.

9. A process in accordance with claim 1 in which the temperature is in the range of from about 1,000° to 1,350° C. and the pressure is in the range of from $1 \times 10^4$ to 500 Torr.

10. In a process for growing diamond metastably by epitaxy on a diamond seed crystal by decomposition of a hydrocarbon gas at a temperature in the range from about 800° to 1,700° C. and a pressure not exceeding 760 Torr, the improvement consisting essentially of interposing a liquid or mobile catalytic layer of iron, nickel, cobalt, or manganese less than 1 mm. thick between said diamond seed crystal and said hydrocarbon gas, said liquid or mobile layer covering essentially the entire surface over which growth is desired so as to provide a solvent medium for transferring in an ordered manner diamond-producing carbon atoms to the substantial exclusion of stable carbides.

11. A solid-liquid contacting process for growing diamond on diamond seed crystals which comprises maintaining a molten liquid or mobile layer of iron, nickel, cobalt, or manganese catalyst having a thickness of less than about 1 mm. over substantially the entire surface over which growth is desired, and contacting said layer with a vaporizable hydrocarbon under the conditions of temperature and pressure of diamond growth, said hydrocarbon yielding a material soluble in said layer under said conditions and epitaxially crystallizable on said seed crystal to the exclusion of non-diamond producing atoms, said temperature being in the range from about 800° to 1,700° C. and said pressure being less than 760 Torr.

* * * * *

UNITED STATES PATENT OFFICE
CERTIFICATE OF CORRECTION

Patent No. 3,661,526          Dated May 9, 1972

Inventor(s) JOHN C. ANGUS and NELSON C. GARDNER

It is certified that error appears in the above-identified patent and that said Letters Patent are hereby corrected as shown below:

Column 4, Line 24, after "deposition or" the quotation mark and the word "This" (first occurrence) should be corrected to read -- "shadowing." --.

Column 5, Line 42, after "reaction" and before "of diamond with hydrogen. . ." the following should be inserted:

-- used for depositing diamond. It has been found that the rate of reaction --.

Column 8, Line 47 (Claim 9), "1 x $10^4$" should read -- 1 x $10^{-4}$ --.

Column 8, Line 40, change "12" to -- 6 --.

Signed and sealed this 23rd day of January 1973.

(SEAL)
Attest:

EDWARD M. FLETCHER, JR.
Attesting Officer

ROBERT GOTTSCHALK
Commissioner of Patents